J. E. GASTON.
FLYING MACHINE.
APPLICATION FILED JAN. 29, 1910.

1,013,484.

Patented Jan. 2, 1912.

3 SHEETS—SHEET 1.

WITNESSES

INVENTOR
JAMES E. GASTON
ATT'Y.

J. E. GASTON.
FLYING MACHINE.
APPLICATION FILED JAN. 29, 1910.
1,013,484.
Patented Jan. 2, 1912.
3 SHEETS—SHEET 2.
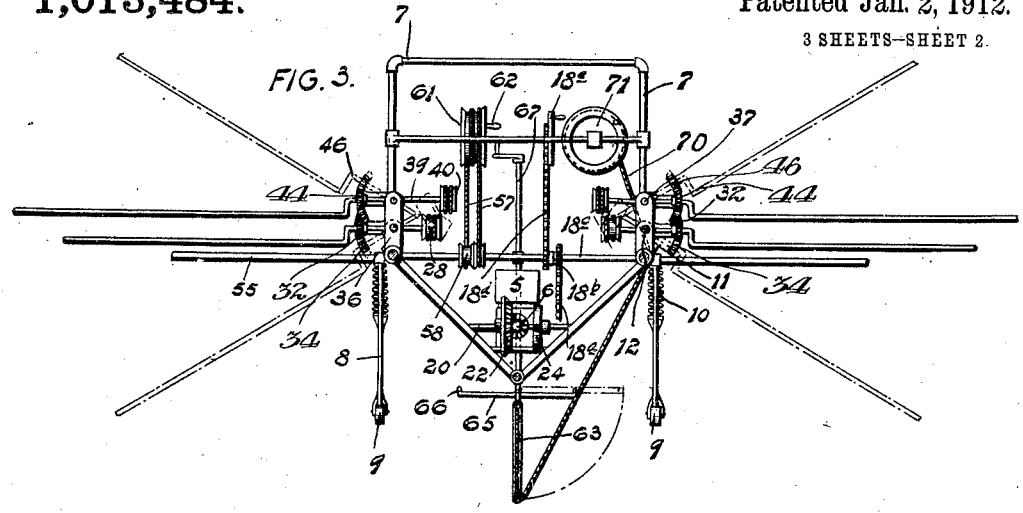
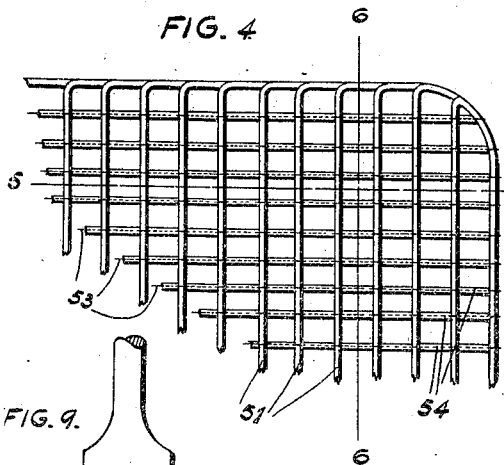
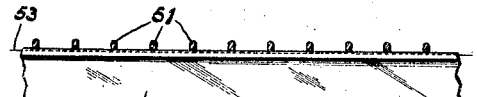
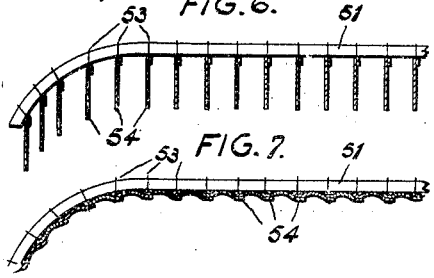
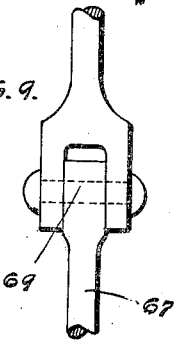
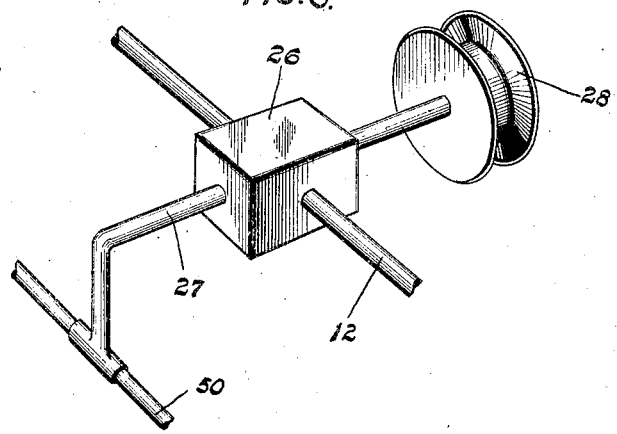
WITNESSES
INVENTOR
JAMES E. GASTON
BY
ATT'Y.

J. E. GASTON.
FLYING MACHINE.
APPLICATION FILED JAN. 29, 1910.
1,013,484.
Patented Jan. 2, 1912.
3 SHEETS—SHEET 3.
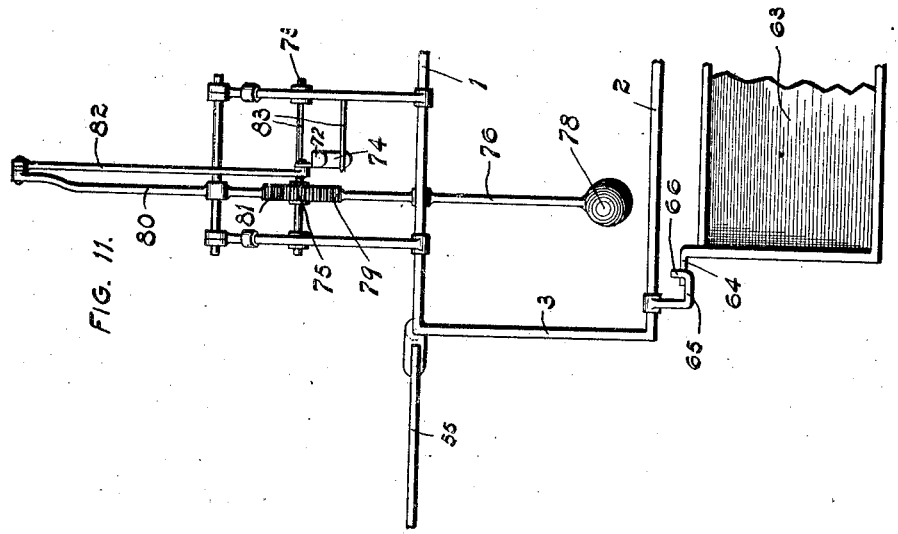
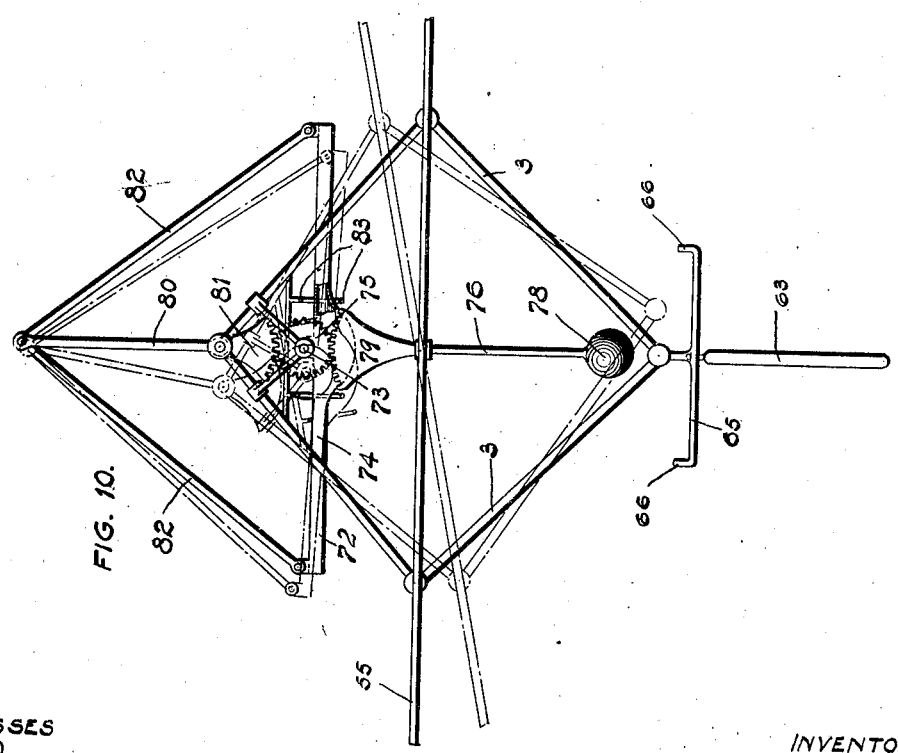
WITNESSES
INVENTOR
JAMES E. GASTON
BY
ATT'Y.

UNITED STATES PATENT OFFICE.

JAMES E. GASTON, OF ST. LOUIS, MISSOURI.

FLYING-MACHINE.

1,013,484.

Specification of Letters Patent.

Patented Jan. 2, 1912.

Application filed January 29, 1910. Serial No. 540,791.

*To all whom it may concern:*

Be it known that I, JAMES E. GASTON, a citizen of the United States, residing at St. Louis, Missouri, have invented a certain new and useful Improvement in Flying-Machines, of which the following is a full, clear, and exact description, such as will enable others skilled in the art to which it appertains to make and use the same, reference being had to the accompanying drawings, forming part of this specification, in which—

Figure 1:
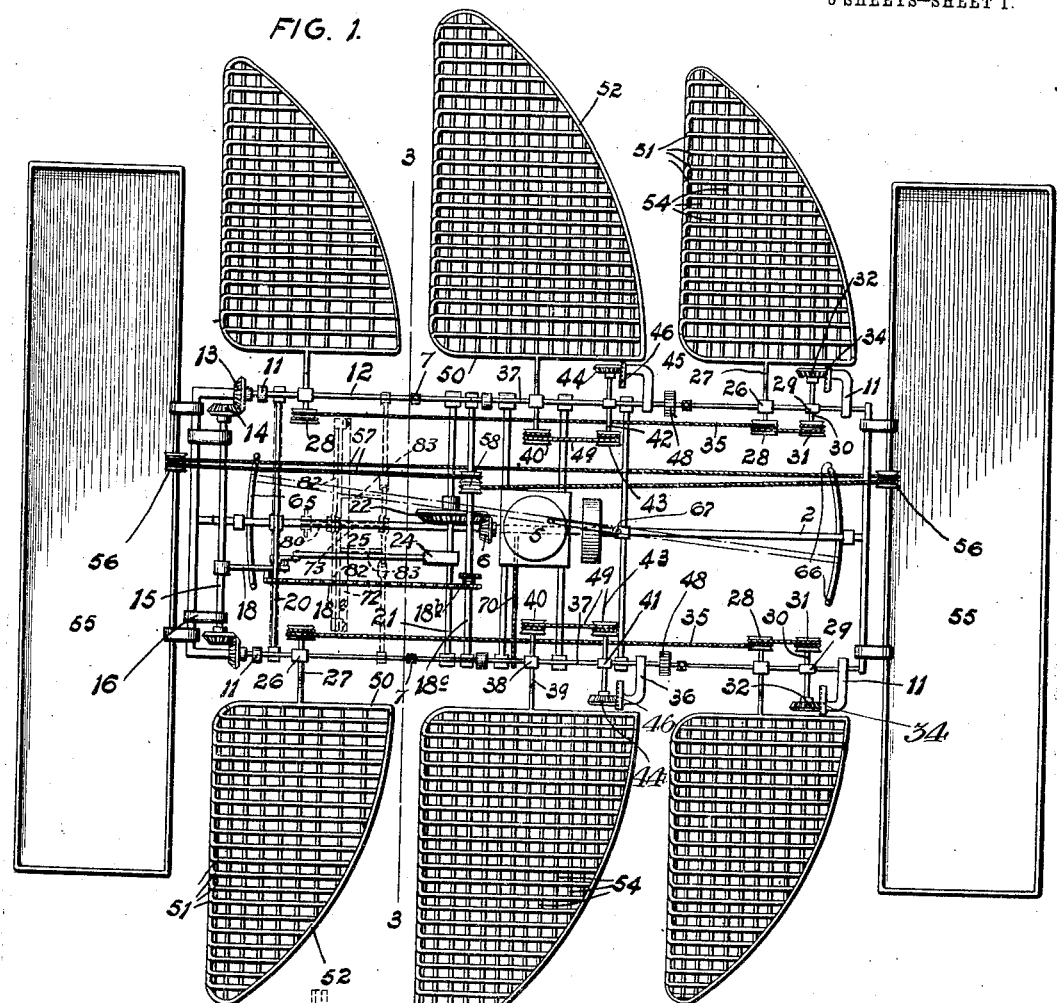
Figure 2:
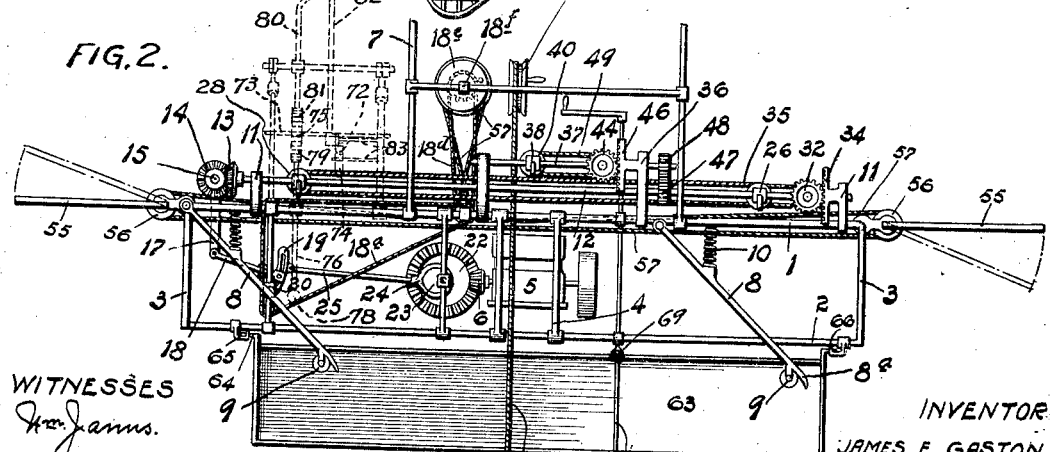

Figure 1 is a plan view of the flying machine of my improved construction. Fig. 2 is a side elevation of the machine. Fig. 3 is a cross section taken approximately on the line 3—3 of Fig. 1. Fig. 4 is a plan view of a portion of one of the wings of my improved machine. Fig. 5 is a section taken on a line 5—5 of Fig. 4. Fig. 6 is a section taken on line 6—6 of Fig. 4. Fig. 7 is a section similar to Fig. 6, and showing the flexible vanes swung upward in the positions they assume when impinging the air. Fig. 8 is a perspective view of a bearing made use of in carrying out my invention. Fig. 9 is a detailed view of a joint in the rod used for shifting the position of the steering plane. Fig. 10 is a front elevation of the machine and showing an apparatus adapted to be applied to the machine for maintaining equilibrium during flight. Fig. 11 is a side elevation of the equilibrium maintaining apparatus.

My invention relates to a flying machine which is equipped with a series of wings which when in motion tend to move the machine forward, said machine being equipped with a steering plane for causing the machine to move laterally in a horizontal plane during flight, and there being planes arranged at both ends of the machine for the purpose of causing said machine to ascend or descend during flight.

The principal objects of my invention are, first; to arrange a series of flexible wings on each side of the machine; second, to provide said wings with a number of vanes which swing from a vertical to a horizontal position during the movement of the wings; third, to provide simple means whereby the wings are caused to vibrate vertically, and at the same time to oscillate slightly; fourth; to provide planes for steering the machine both laterally and vertically, and fifth, to provide means, whereby the movements of the wings, and the planes are readily controlled.

To the above purposes my invention consists in certain novel features of construction, and arrangement of said parts hereinafter more fully described and claimed.

The frame of my improved machine which is triangular in cross section comprises a pair of side rails 1, a bottom rail 2, which rails are framed together at the ends, and at suitable distances apart throughout their length by cross rails or braces 3, all of which rails and braces are preferably formed of light metal tubing.

Arranged on suitable braces 4, at a central point in the frame is a motor 5 preferably of the internal combustion type, and located on the forward end of the main driving shaft of the motor is a small gear wheel 6. Projecting upward from the central portion of the frame of the machine is an auxiliary skeleton frame 7 constructed preferably of light metal tubing, and in which frame are arranged the various operating handles and levers by means of which the movements of the various parts of the machine are controlled.

The machine is supported while on the ground by legs 8 which are pivotally connected at their upper ends to the rails 1 and arranged at the lower ends of said legs are rollers 9 which travel over the surface of the ground when the machine is started. Compression coil springs 10 are interposed between the legs 8, and the side rails 1, and thus yieldingly support the main portion of the machine while the same is on the ground during the time the machine is being started. The lower ends of the legs 8 are provided with prongs $8^a$ which engage in the ground when the machine is being started.

Extending upward from the side rails 1 adjacent the ends thereof are brackets 11 in which are journaled rock shafts 12. Fixed on the front ends thereof are beveled pinions 13, and meshing with said pinions 13 are corresponding beveled pinions 14, which are located on the ends of a transversely disposed rock shaft 15, the same being journaled in bearings 16 extending upward from the cross rail at the front end of the frame of the machine.

Fixed to and depending from the shaft 15 is an arm 17, to the lower end of which is pivotally connected the forward end of a link 18, the opposite end of this link being slidably mounted in the slot of a vertically disposed link 19, the lower end of which is pivotally connected to a bracket 20 located on the forward portion of the frame.

The rearward portion of the link 18 is connected to a chain 18ª which passes around suitably located pulleys on the frame of the machine, and said chain also passes around a double sprocket wheel 18ᵇ, loosely mounted on a transversely disposed shaft 18ᶜ journaled in the frame. A second sprocket chain 18ᵈ passes around the opposite portion of the sprocket wheel 18ᵇ, and also around a hand wheel 18ᵉ, which latter is journaled on a shaft 18ᶠ arranged in the upper portion of the auxiliary frame 7.

Arranged for rotation in suitable bearings on the frame immediately in front of the engine 5 is a transversely disposed shaft 21 on which is fixed a large bevel gear wheel 22, which meshes with and is driven by the pinion 6. Arranged on this shaft 21 is an eccentric 23 around which passes a strap 24, and connected to said strap is the rear end of a connecting rod 25, the forward end of which is pivotally connected to the upper portion of the link 19. The mechanism just described provides means for converting the rotary motion of the main driving shaft of the engine into rocking motion which is imparted to the shaft 15.

Fixed on the rock shafts 12 adjacent the bearings 11 are blocks 26 in which are journaled short shafts 27 which carry the front and rear pairs of the wings. Fixed on the inner ends of these shafts 27 are grooved pulleys 28.

Fixed on the rear portions of the rock shafts 12 are bearings 29 in which are journaled short shafts 30 carrying on their inner ends grooved pulleys 31, and provided on their outer ends with beveled pinions 32.

Rigidly fixed in the upper portions of the bearings 11 on the rear end of the machine are toothed segments 34, with which engage the pinions 32.

Cables 35 pass around each set of the grooved pulleys 28 and 31, thus providing means for simultaneously rocking the shafts 27 in the bearing blocks 26, and the rock shafts 12 upon which said block 26 are fixed provide means for swinging the shafts 27 vertically at the same time they are rocked and consequently the wings carried by the outer ends of the shaft 27 are simultaneously rocked and caused to vibrate vertically.

Fixed to the central portion of each rail 1 and projecting upward therefrom is a pair of brackets 36 in which the corresponding rock shaft 12 is loosely mounted and journaled in the upper ends of each pair of these brackets is a rock shaft 37. Fixed on each rock shaft is a bearing 38 in which is journaled a short shaft 39, and fixed on the inner end of each shaft is a grooved pulley 40. Fixed on the rear portion of each shaft 37 is a bearing 41, and loosely mounted therein is a short shaft 42 carrying on its inner end a grooved pulley 43, and upon its outer end a beveled pinion 44.

Formed on or fixed to the upper ends of the brackets 36 are toothed segments 46, with which the beveled pinions 44 engage.

Fixed on each of the rock shafts 12 immediately to the rear of the mechanism just described is a small gear wheel 47, which meshes with a corresponding gear wheel 48 fixed on the rear end of the corresponding shaft 37. Cables 49 connect the pairs of grooved pulleys 40 and 43.

The wings of my improved machine are carried by the outer ends of the shafts 27 and 39, and all of these wings are alike in construction and operation, and may be all of the same size, although I prefer to make the central pair of the wings somewhat larger than the front and rear pair. Each wing comprises an inflexible inner rail 50 which is preferably formed of light metal tubing, and said rail is connected to the inner end of the corresponding short shaft 27 or 39. The forward end of this rail curves downward as shown in Figs. 6 and 7, and this downward curvature is maintained in cross section throughout the entire length of the wing. The body of the wing is made up of a series of thin strips 51 of some light, strong and flexible material such as ratan, and the forward ends of these strips are connected to one another in any suitable manner while the rear ends are connected by a curved strip 52, the inner end of which is connected to the rear end of the rail 50.

Arranged on the under side of each wing and transversely disposed relative to the length of the machine is a series of wires 53 to which are connected the upper ends of a series of flexible vanes 54, preferably of fabric such as canvas, and said vanes being of such length that their free edges will just overlap the attached edges of the adjacent vanes when moved into an approximate horizontal plane as shown in Fig. 7. The flexibility of the vanes provide for the formation of a series of shallow pockets on the under side of the wing, when the same is impinging the air during downward movement, and such impingement exerts a lifting effect on the machine.

Arranged in front of and to the rear of the machine are horizontally disposed planes 55 utilized for causing the machine to ascend or descend during flight. These planes are preferably formed of rectangular frames of metal tubing or wood, over which a suitable fabric is stretched. The front rail of the rear plane, and the rear rail of the front plane are journaled in suitable bearings carried by the frame 3 of the machine, and fixed on the rails just mentioned are grooved pulleys 56 around which passes a cable 57, which also passes around a pair of grooved pulleys 58, located on the transverse shaft 18ᶜ.

Arranged for rotation on the shaft 18ᶠ is a large grooved pulley 61 provided with a handle 62, and around which pulley 61 the cable 57 passes. The mechanism just described provides means whereby the planes 55 are simultaneously operated to guide the machine vertically during flight, and when said planes are operated the forward ends of the front plane will be elevated, and at the same time the rear end of the rear plane will be depressed as shown by dotted lines in Fig. 2. A vertically disposed plane 63 is arranged beneath the lowermost rail 2 of the frame which plane extends approximately the entire length of said frame, and acts as a rudder to guide the movement of the machine laterally during flight. The upper corners of this plane 63 are provided with outwardly projecting pins 64 which are arranged to slide on the horizontally disposed rods 65 carried by the rail 2. The ends of these rods 65 are bent upward as designated by 66 in order to prevent the pins 64 from leaving said rods 65 when the steering plane is shifted.

The plane 63 is actuated by means of a vertically disposed shaft 67 journaled in suitable bearings in the frame of the machine, and provided on its upper end with an operating handle. A hinge joint 69 shown in Fig. 9 is provided in the shaft 67 to permit the steering plane to swing into a horizontal position when the machine is on the ground, (see dotted lines Fig. 3). The frame 63 is swung into a horizontal position by means of a cable 70 attached at one end to the underside of the frame 63, and at its opposite end to a grooved pulley 71 arranged for rotation in the auxiliary frame 7.

A device which can be applied to the machine for maintaining equilibrium during flight is illustrated in Figs. 10 and 11, and is preferably located on the machine directly in front of the auxiliary frame 7. This device comprises a transversely disposed tube 72 pivotally mounted at its center upon a shaft 73 journaled in the frame of the machine, and formed at the center of the tube is a depending pocket 74. This pocket is filled with mercury, and when the tube is tilted in either direction the mercury will immediately run into the lower end of the tube, thereby tending to further depress the lower end of the tube.

Fixed on the shaft 73 with the tube 72 is a pinion 75. Pivotally supported in the frame of the machine, immediately below this pinion 75 is a vertically disposed rod 76 carrying on its lower end a weight 78, and being provided on its upper end with a toothed segment 79, which meshes with the pinion 75.

Pivotally arranged in the frame above the pinion 75 is a vertically disposed rod 80 on the lower end of which is formed a toothed segment 81, which meshes with the pinion 75. Connecting rods 82 extend between the ends of the tube 72, and the upper end of the rod 80. Fixed in the frame of the machine above and below the tube 72 and at equal distances away from the center thereof are pins 83 against which the tube 72 is adapted to bear when moved out of a horizontal position. This construction provides means whereby the weight of the mercury after the same has run into the lowermost end of the tube 72 is utilized and applied to the frame of the machine in such a manner as to restore equilibrium and right the machine.

The operation of my improved machine is as follows: The motor 5 during operation drives the shaft 21, owing to the meshing gear wheels 6 and 22, and the connecting rod 25 actuated by the eccentric 23 rocks the link 19 backward and forward. This rocking motion is imparted to the shaft 15 by means of the link 18, and arm 17, and the rocking motion of said shaft 15 is transmitted to the shafts 12 by the meshing beveled pinions 13 and 14. As said shafts 12 rock, the bearings 26 carried thereby will likewise rock, and as a result the short shafts 27 and wings carried thereby will rock or vibrate vertically. Simultaneous with this vertical rocking movement or vibration the pinions 32 carried by the outer end of the said short rock shaft 30 will engage with the teeth of the segments 34, and as a result the shafts 30 will be rocked and by reason of the cables 35 engaging the grooved pulleys 28, said pulleys together with the shafts 27 will be rocked, and thus the wings will have a slight rocking motion simultaneous with their vertical vibration. The mechanism for imparting these movements to the wings is so arranged as that the front edges of said wings are elevated at the same time the outer ends of said wings move upward, and this movement readily permits the air to pass beneath the wings during the forward movement of the machine. During the upward movement of the wings the vanes 54 naturally swing into vertical positions by reason of the air pressure on top of said vanes, and when said wings move downward the vanes swing upward into horizontal position, thus impinging the air and exerting a lifting effect upon the machine.

The operation of the wings as just described pertains only to the front and rear pairs of wings, and the mechanism shown and described causes these two pairs of wings to operate simultaneously. The central pair of wings, which are preferably larger than the rear and front pairs operate alternately relative to the operation of the front and rear pair and the movement of said central pair of wings is identical with the movement of the wings heretofore described, inasmuch as it is brought about by mechanism which corresponds in every way to the mechanism used for operating the front and rear pairs of wings.

The rocking motion of the shafts 12 is imparted to the shafts 37 by means of the meshing pinions 47 and 48, and as the shafts 37 are thus rocked the pinions 44 meshing with the segmental racks 46 impart corresponding rocking motion to the shafts 42 and as a result the center wings are partially rotated simultaneous with their vertical vibration.

During flight the machine is caused to ascend or descend by manipulating the planes 55, which as heretofore described move together, and are operated by rotating the grooved pulleys 61 around which the cable 57 passes. This cable passes around the pulleys 56 and a proper movement of the grooved wheel 61 causes the front end of the front plane to be elevated and at the same time moves the rear end of the rear plane downward, and with the planes so positioned the machine will tend to move upward simultaneous with its forward movement.

When the positions of the planes 55 are reversed the machine will tend to move downward simultaneous with its forward movement, and such downward or upward movement is brought about by the impingement of air on the upper or lower sides of the planes 55.

The vertical plane 63 supported beneath the machine controls the movement of the machine laterally during its forward flight, said plane 63 being shifted in an angular position relative to the forward line of flight by means of the handle 68 on the upper end of the rod 67, and when said plane is shifted into an angular position the impingement of air on the front side of the plane causes the machine to correspondingly move laterally simultaneous with its forward movement.

The equilibrium of the machine is maintained by the use of the device shown in Figs. 10 and 11. Should the machine dip sidewise during flight the weighted rod 76 will maintain a vertical position, and as a result the pinion 75 will be slightly rotated in turn imparting movement to the segment 81, and the rod 80 on which said segment is formed, such movement will be transmitted by means of connecting rods 82 to the tube 72, which latter will be tilted in a direction opposite the direction in which the machine tilts. As soon as one end of the tube 72 is lowered the mercury contained in the pocket 74 will run into the lower end of the said tube, thus placing a considerable weight at the lower end of said tube, and said tube at its tilted position will bear upon one of the pins 83 and act as a weighted lever having a tendency to restore the frame of the machine to its normal position. The positions of the various parts of the equilibrium device at the time the machine tilts to one side are clearly shown by dotted lines in Fig. 10.

To regulate the vertical movement of the wings the operator shifts the position of the link 18 so as to change the position of the pivot point between the front end of the said link 18, and the slotted link 19, which action is brought about by a manipulation of the hand wheel 18ᵉ, and by means of the chains 18ᵈ and 18ᵃ the front end of the link 18 can be moved vertically in the slot link 19, and thus the rocking motion imparted to the shaft 15 and shafts 12 is varied as desired.

By forming the wings of my improved machine of ratan or the like, said wings are in a measure flexible, which is a desirable factor in machines to which my invention pertains, and by simultaneously imparting a partial rotary and a vertical rocking motion to said wings a movement simultaneous to the movements of a bird's wings is obtained.

It will be readily understood that minor changes in the form and construction of the various parts of my improved flying machine can be made and substituted without departing in the least from the spirit of my invention.

I claim:

1. In a machine of the class described, a wing provided with a series of flexible ribs, the front ends of which are curved downward, a series of flexible vanes depending from said ribs, and means whereby said wing is vibrated vertically.

2. In a flying machine of the class described, the combination with a frame, of propelling means thereon, and an equilibrium maintaining device mounted on said frame, and which equilibrium maintaining device includes a transversely disposed tube pivotally mounted at its center, and a pendulum, the upper end of which coöperates with said mercury containing tube.

3. In a flying machine of the class described, the combination with a frame, of propelling means thereon and an equilibrium maintaining device comprising a transversely disposed tube adapted to contain mercury, a pendulum pivotally mounted on the frame at a point below the central portion of the tube, and a connection between the upper end of the pendulum and the mercury tube whereby swinging movement of the pendulum imparts tilting movement to the mercury containing tube.

4. In a machine of the class described, a frame, a series of flexible wings arranged in pairs on the sides of the frame, flexible vanes depending from the under sides of the wings, means for simultaneously vibrating and partially rotating the wings, and means for imparting the vibrating movement alternately to the pairs of wings.

5. In a flying machine of the class described, the combination with a frame, of propelling wings thereon, and an equilibrium maintaining device comprising a transversely disposed tube adapted to contain mercury, and means whereby said tube is tilted in opposite direction to the direction in which the machine tilts, and which tube bears on the frame of the machine when tilted to restore said frame to its normal position.

6. The combination with a flying machine, of an equilibrium maintaining device, consisting of a transversely disposed tube pivotally mounted at the center, a pocket at the center of said tube which pocket is adapted to contain mercury, and means whereby said tube is tilted in a direction opposite the direction in which the frame of the machine tilts, and means on the frame of the machine against which the tube engages when tilted.

7. In a machine of the class described, a wing comprising an inflexible inner rail, a series of flexible strips, the forward ends of which are curved downward, a curved strip connecting the rear ends of the flexible strips, and a series of flexible vanes suspended from the flexible strips.

8. In a machine of the class described, a wing provided with a series of flexible ribs, the front ends of which are curved downward, a series of flexible vanes depending from said ribs, and means whereby said wing is simultaneously vibrated and partially rotated.

9. In a machine of the class described, a frame, a series of flexible wings arranged on each side thereof, the front edges of which wings are curved downwardly, means whereby said wings are simultaneously vibrated and partially rotated, and means for guiding the movement of the machine vertically and laterally during flight.

10. In a machine of the class described, a frame, a series of flexible wings arranged on each side thereof, the front edges of which wings are curved downwardly, and which wings are simultaneously vibrated and partially rotated, means for guiding the movement of the machine vertically and laterally during flight, and means on the machine for maintaining equilibrium during flight.

11. In a machine of the class described, a frame, a series of flexible wings arranged on each side thereof, a series of flexible vanes depending from and forming a part of each wing, means whereby said wings are simultaneously vibrated and partially rotated, and means for varying and regulating the movement of the wing actuating mechanism.

12. In a machine of the class described, a frame, a series of flexible wings arranged on the sides thereof, a series of flexible vanes depending from and forming a part of each wing, means whereby said wings are simultaneously vibrated and partially rotated, means for varying and regulating the movement imparted to the said wings, and means for guiding the movement of the machine vertically and laterally during flight.

13. In a machine of the class described, a frame, a series of flexible wings arranged on the sides thereof, a series of flexible vanes depending from and forming a part of each wing, means whereby said wings are simultaneously vibrated and partially rotated, means for varying and regulating the movement imparted to the said wings, means for guiding the movement of the machine vertically and laterally during flight, and an equilibrium maintaining means arranged for operation on the frame of the machine.

In testimony whereof I hereunto affix my signature in the presence of two witnesses, this 22nd day of January, 1910.

JAMES E. GASTON.

Witnesses:
M. P. SMITH,
E. M. HARRINGTON.

---

Copies of this patent may be obtained for five cents each, by addressing the "Commissioner of Patents, Washington, D. C."